(12) United States Patent
Chiang et al.

(10) Patent No.: US 10,598,907 B2
(45) Date of Patent: Mar. 24, 2020

(54) OPTICAL LENS

(71) Applicant: Rays Optics Inc., Hsinchu County (TW)

(72) Inventors: Bing-Ju Chiang, Hsinchu County (TW); Yuan-Hung Su, Hsinchu County (TW); Kuo-Chuan Wang, Hsinchu County (TW)

(73) Assignee: RAYS OPTICS INC., Hsinchu County (TW)

( * ) Notice: Subject to any disclaimer, the term of this patent is extended or adjusted under 35 U.S.C. 154(b) by 142 days.

(21) Appl. No.: 15/628,181

(22) Filed: Jun. 20, 2017

(65) Prior Publication Data
US 2018/0120544 A1    May 3, 2018

(30) Foreign Application Priority Data

Oct. 28, 2016   (TW) .............................. 105134922 A

(51) Int. Cl.
| | | |
|---|---|---|
| G02B 13/06 | (2006.01) | |
| G02B 13/00 | (2006.01) | |
| G02B 3/02 | (2006.01) | |
| G02B 13/18 | (2006.01) | |
| G02B 9/64 | (2006.01) | |

(52) U.S. Cl.
CPC .............. G02B 13/06 (2013.01); G02B 3/02 (2013.01); G02B 13/0045 (2013.01); G02B 9/64 (2013.01); G02B 13/18 (2013.01)

(58) Field of Classification Search
CPC ...... G02B 13/06; G02B 13/00; G02B 13/003; G02B 13/0045; G02B 3/02; G02B 13/18; G02B 1/00; G02B 1/007; G02B 9/64

USPC .................................. 359/692, 793, 691, 646
See application file for complete search history.

(56) References Cited

U.S. PATENT DOCUMENTS

| | | | |
|---|---|---|---|
| 7,023,628 B1 | 4/2006 | Ning | |
| 7,046,458 B2 | 5/2006 | Nakayama | |
| 7,283,312 B2 | 10/2007 | Kawada | |
| 2010/0182677 A1* | 7/2010 | Wang ....................... | G02B 9/64 359/356 |
| 2015/0062720 A1* | 3/2015 | Lai .......................... | G02B 13/04 359/713 |
| 2017/0168271 A1* | 6/2017 | Jiang ....................... | G02B 9/08 |

FOREIGN PATENT DOCUMENTS

| | | | | |
|---|---|---|---|---|
| JP | 2009092798 | * | 4/2009 | ............. G02B 13/04 |
| TW | I418873 B | | 12/2013 | |

OTHER PUBLICATIONS

English translation of JP 2009092798, machine translated on Dec. 12, 2019.*

* cited by examiner

*Primary Examiner* — Jie Lei
(74) *Attorney, Agent, or Firm* — Muncy, Geissler, Olds & Lowe, PC

(57) ABSTRACT

An optical lens includes a first lens group having negative refractive power, a second lens group having positive refractive power, and an aperture stop disposed between the first lens group and the second lens group. A total number of lenses of the two lens groups is less than 9. The first lens group has at least three lenses with refractive power and at least one aspheric lens. The second lens group has at least three lenses with refractive power and at least one aspheric lens. The first lens group includes a lens having positive refractive power and an Abbe number of smaller than 20.

18 Claims, 9 Drawing Sheets

OPTICAL LENS

BACKGROUND OF THE INVENTION a. Field of the Invention

The invention relates generally to an optical lens, and more particularly to a panoramic lens.

b. Description of the Related Art

Recent advances in technology have led to the development of various types of optical lenses. A wide-angle lens, such as described in Taiwan patent no. I418873, is a commonly used optical imaging lens. An optical lens having a field of view (FOV) greater than 180 degrees is typically referred to as a fisheye lens or a panoramic lens. A panoramic lens, such as used in a driver-assistance system, often needs to achieve lower fabrication costs, a larger aperture stop, wider viewing angles, lighter weights, a wider working temperature range and a larger image circle. Therefore, it is desirable to provide a panoramic lens having a wider working temperature range, a larger image circle, lower fabrication costs and good imaging quality.

BRIEF SUMMARY OF THE INVENTION

According to one aspect of the present disclosure, an optical lens includes a first lens group having negative refractive power, a second lens group having positive refractive power, and an aperture stop disposed between the first lens group and the second lens group. A total number of lenses of the two lens groups is less than 9. The first lens group has at least three lenses with refractive power and at least one aspheric lens. The second lens group has at least three lenses with refractive power and at least one aspheric lens. The first lens group includes a lens having positive refractive power and an Abbe number of smaller than 20.

According to the above embodiments, a panoramic lens that has a wider working temperature range, a larger image circle, lower fabrication costs and good imaging quality is provided.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the teems "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
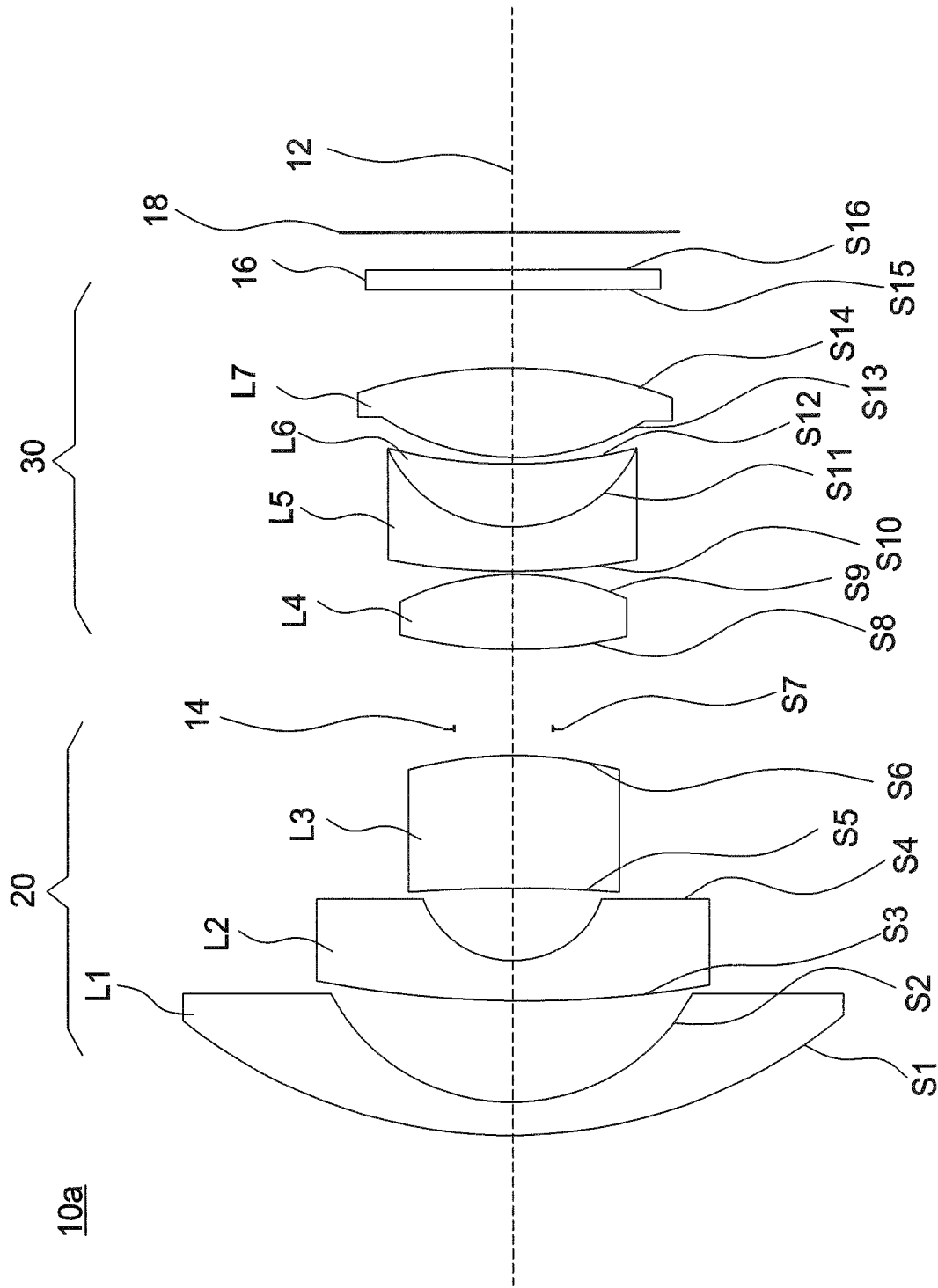
FIG. 1 shows a schematic diagram illustrating an optical lens according to an embodiment of the invention.

FIG. 1 shows a schematic diagram illustrating an optical lens according to an embodiment of the invention. The optical lens 10a is disposed between a magnified side (such as an object side on the left of FIG. 1) and a minified side (such as an image side on the right of FIG. 1). As shown in FIG. 1, the optical lens 10a may include a first lens group 20 (such as a front lens group) with negative refractive power disposed between the magnified side and the minified side, a second lens group 30 (such as a rear lens group) with positive refractive power disposed between the first lens group 20 and the minified side, and an aperture stop 14 disposed between the first lens group 20 and the second lens group 30. Further, the minified side may be disposed with a cover glass 16 and an image sensor having an image plane 18 formed at an effective focal length (EFL) for visible light. The cover glass 16 is disposed between the second lens group 30 and the image plane 18 for visible light. The first lens group 20 may include a first lens L1, a second lens L2 and a third lens L3 arranged in order, along an optical axis 12, from the magnified side to the minified side. The second lens group 30 may include a fourth lens L4, a fifth lens L5, a sixth lens L6 and a seventh lens L7, arranged in order, along the optical axis 12, from the magnified side to the minified side. The refractive powers of the first lens L1 to the seventh lens L7 are negative, negative, positive, positive, negative, positive and positive. In this embodiment, the second lens L2 and seventh lens L7 are aspheric lenses. A refractive index variation as a function of temperature (dn/dt) of an aspheric lens may be smaller than $-80\times10^{-6}$ $K^{-1}$, but the invention is not limited thereto. In one embodiment, the aspheric lens may be made by glass molding. The first lens L1, the third lens L3, the fifth lens L5 and the sixth lens L6 are meniscus lenses, and the fourth lens L4 is a biconvex lens. Further, the fifth lens L5 and the sixth lens L6 are cemented together as one piece to form a cemented doublet having positive refractive power. Note that adjoining surfaces of the fifth lens L5 and the sixth lens L6 in a cemented lens have an identical radius of curvature, and that the lenses in a cemented lens can be cemented together by various ways. For example, the lenses may be cemented together by applying an optical adhesive on lens surfaces or stacked and then pressed to be fitted with each other, but the invention is not limited thereto. In another embodiment, the adjacent surfaces of the fifth lens L5 and the sixth lens L6 may have an identical radius of curvature but maintain a small gap along the optical axis 12. The detailed optical data of the optical lens 10a such as lens parameters, shape and aspheric coefficients are shown in Tables 1-2 below. In the following design examples of the invention, each aspheric surface satisfies the following equation:

$$Z = \frac{cr^2}{1+\sqrt{1-(1+k)c^2r^2}} + Ar^4 + Br^6 + Cr^8 + Dr^{10} + Er^{12} + Fr^{14} + \ldots, \quad (1)$$

where Z denotes a sag of an aspheric surface along the optical axis 12, c denotes a reciprocal of a radius of an osculating sphere, K denotes a Conic constant, r denotes a height of the aspheric surface measured in a direction perpendicular to the optical axis 12, and parameters A-F shown in Table 2 are 4th, 6th, 8th, 10th, 12th and 14th order aspheric coefficients. In this embodiment, because the optical lens is a fixed focus lens, a distance between any two lenses in the optical lens remains fixed on picking-up images at various object distances.

In the above Table 1, the field heading "thickness" represents a distance of two adjacent surfaces along the optical axis 12. For example, a thickness of the surface S1 is a distance between the surface S1 and the surface S2 along the optical axis 12, a thickness of the surface S2 is a distance between the surface S2 and the surface S3 along the optical axis 12, and a thickness of the surface S16 is a distance between the surface S16 of the cover glass 16 and the visible light image plane 18 along the optical axis 12.

TABLE 2

|   | S3 | S4 | S13 | S14 |
|---|---|---|---|---|
| K | 0 | 0 | 0 | 0 |
| A | 6.96E-003 | 1.01E-002 | -3.66E-003 | -3.06E-003 |
| B | -5.70E-004 | 4.12E-004 | 4.49E-004 | 9.24E-004 |
| C | 2.35E-005 | 8.33E-004 | -9.10E-005 | -1.34E-004 |
| D | -1.12E-007 | -3.87E-004 | 7.63E-006 | 6.34E-006 |
| E | -3.61E-008 | 9.37E-005 | -4.15E-007 | -1.72E-007 |
| F | 1.19E-009 | -1.11E-005 | 0.00E+000 | 0.00E+000 |

Figure 2:
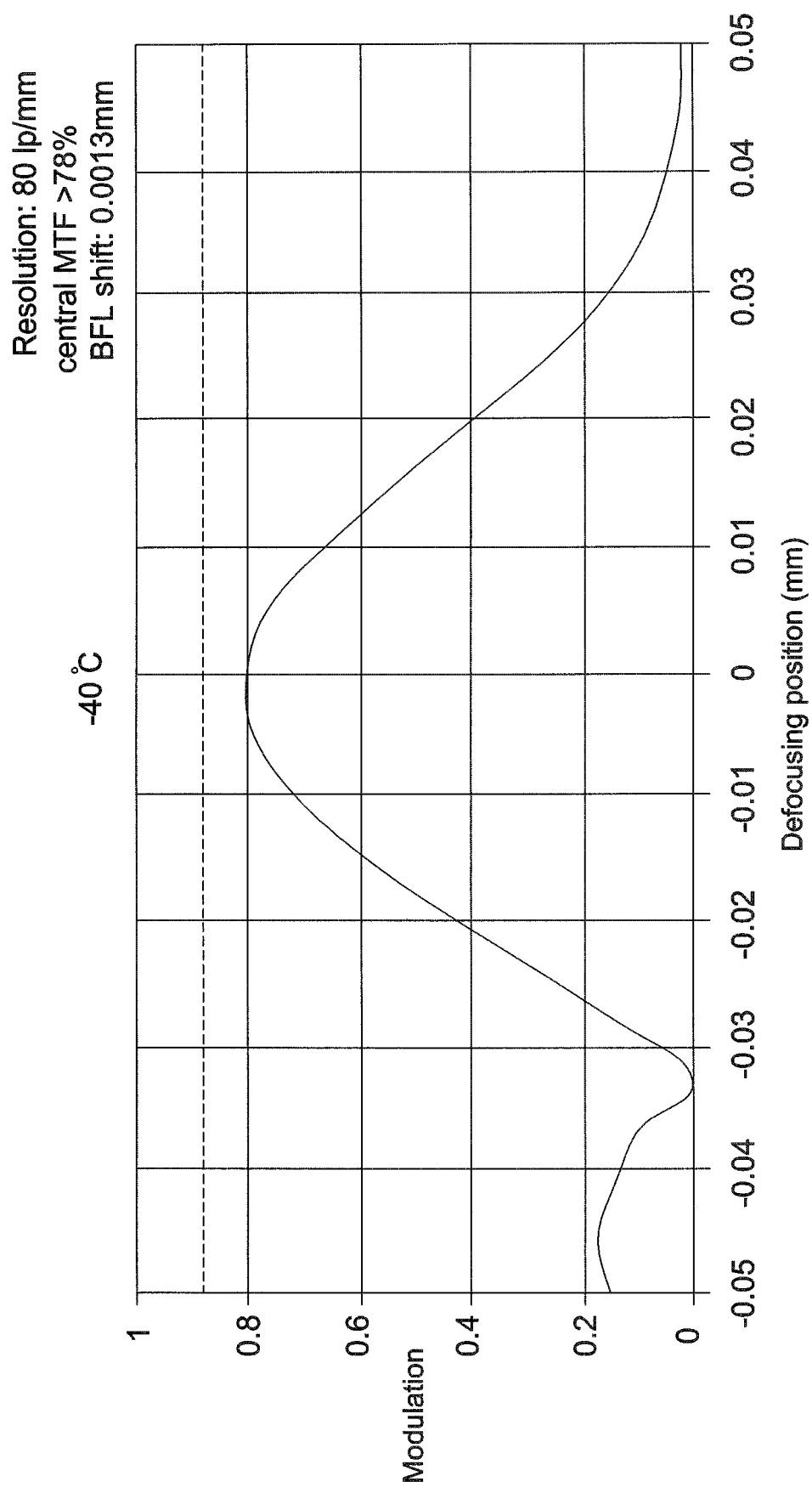
FIGS. 2-4 show optical simulation results of the optical lens shown in FIG. 1, where diffractive MTF curves for visible light respectively measured at a temperature of −40° C., 20° C. and 105° C. are depicted.
Figure 3:
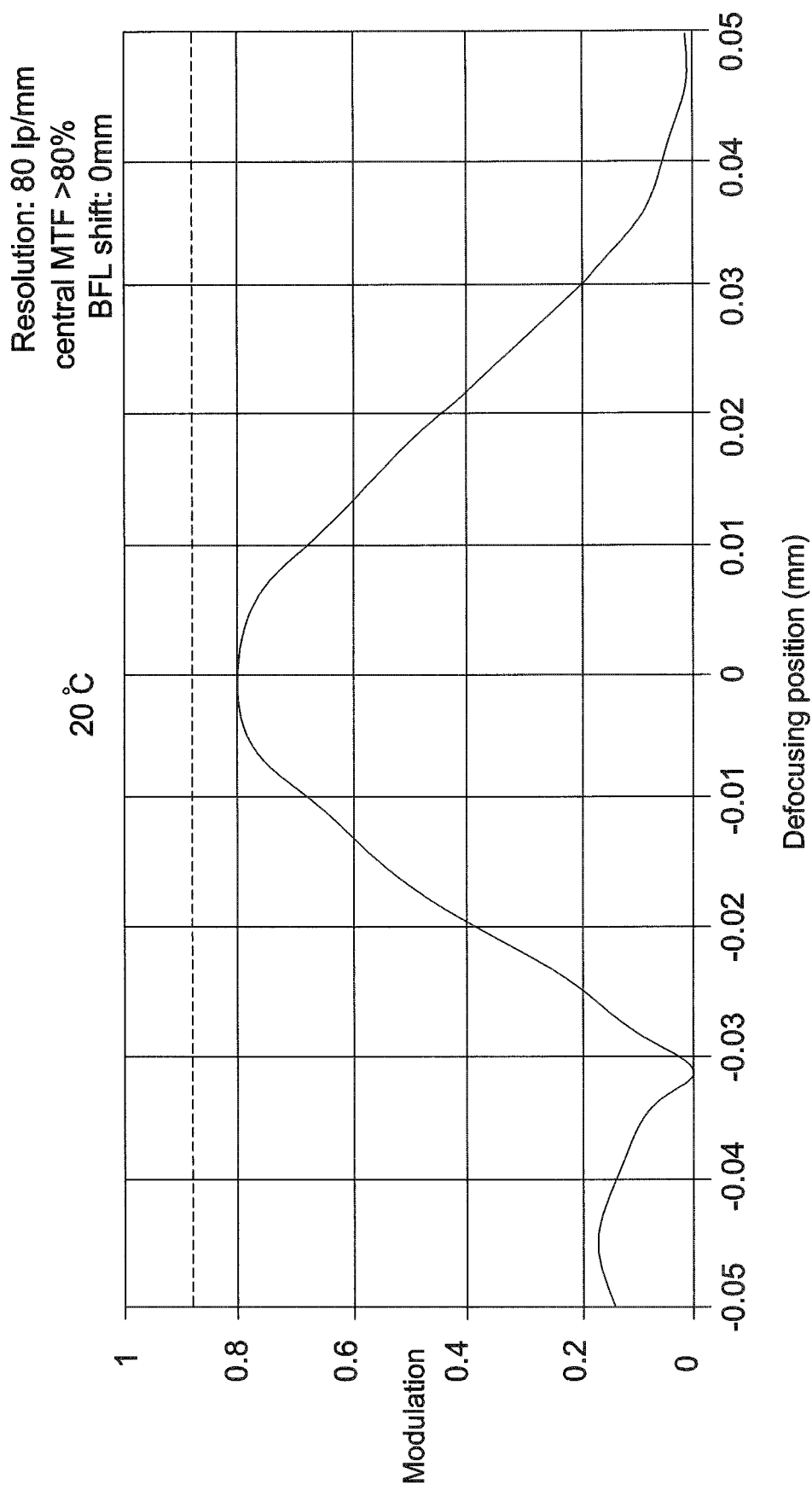
Figure 4:
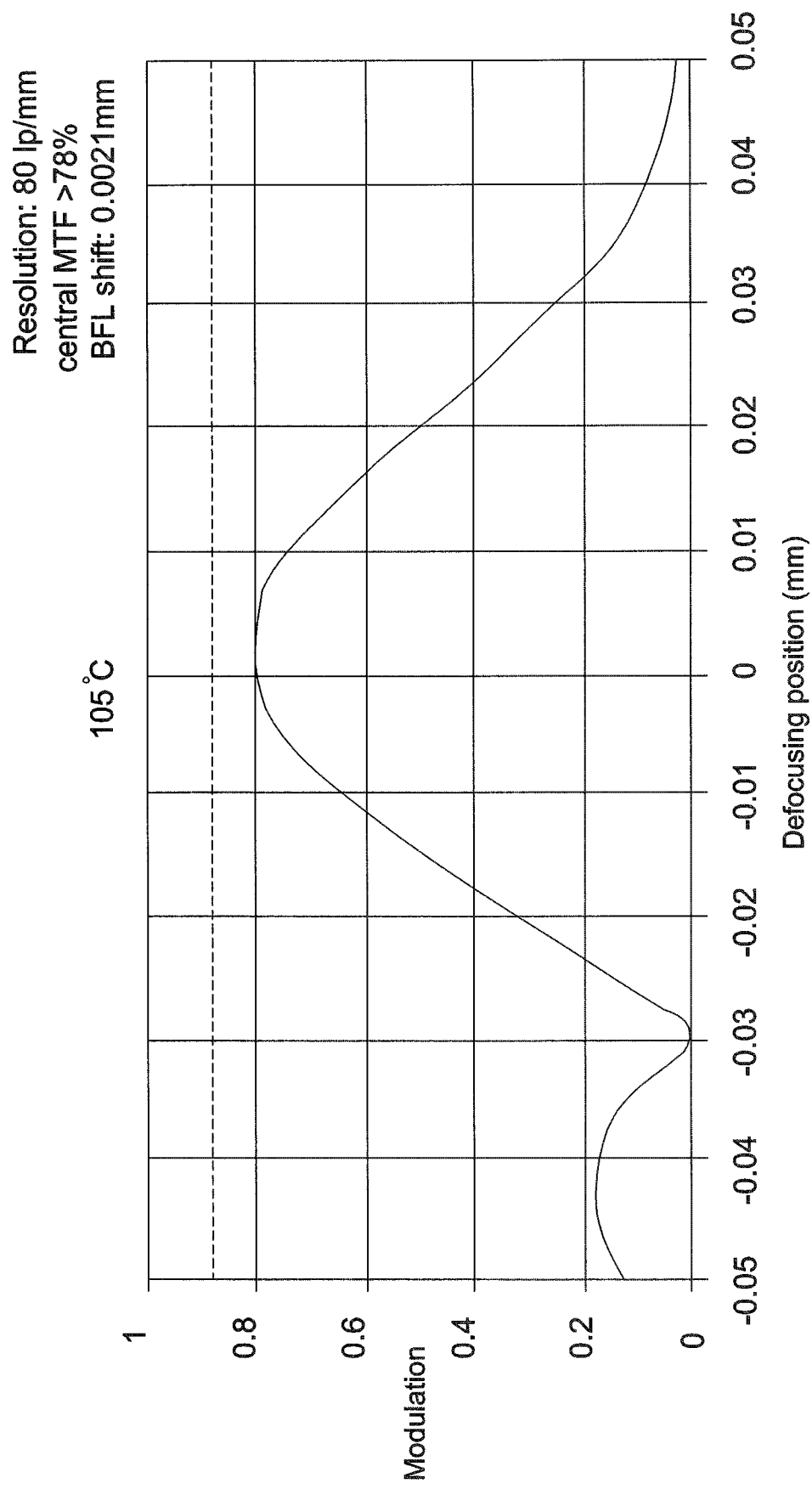

FIGS. 2-4 depict diffractive MTF curves for visible light respectively measured at a temperature of -40° C., 20° C. and 105° C. Under the condition of a lens resolution of 80 lp/mm, the MTF value measured at the center of each diffractive MTF curve shown in FIGS. 2-4 is all larger than 78%. Further, by comparing different diffractive MTF curves shown in FIGS. 2-4, it can be seen, in case a back focal length (BFL) measured at 20° C. serves as a reference BEL, a focus shift on the BFL measured at -40° C. and a focus shift on the BFL measured at 105° C. relative to the reference BEL are both smaller than 3 μm. The simulated results shown in FIGS. 2-4 are within permitted ranges specified by the standard, which indicates the optical lens 10a according to the above embodiment may achieve good imaging quality in a wide temperature range of -40° C. to 105° C.

An optical lens according to one embodiment of the invention may include two lens groups (a front lens group and a rear lens group) and may have an F number of 2.0, and each of the lens groups may have at least three lenses with refractive power and at least one aspheric lens to correct monochromatic and chromatic aberrations. The optical lens

TABLE 1

| Surface | Radius(mm) | Thickness(mm) | Refractive index | Abbe number | Object description |
|---|---|---|---|---|---|
| S1 | 11.39 | 0.80 | 1.88 | 40.8 | L1(meniscus) |
| S2 | 4.33 | 2.35 | | | |
| S3* | -26.13 | 0.90 | 1.52 | 55.4 | L2(aspheric) |
| S4* | 2.21 | 1.46 | | | |
| S5 | -37.46 | 3.10 | 1.92 | 18.9 | L3(meniscus) |
| S6 | -7.46 | 0.80 | | | |
| S7 | ∞ | 1.50 | | | aperture stop |
| S8 | 18.94 | 1.54 | 1.49 | 81.5 | L4(biconvex) |
| S9 | -4.89 | 0.12 | | | |
| S10 | 9.69 | 0.90 | 1.92 | 18.9 | L5(meniscus) |
| S11 | 3.00 | 1.94 | 1.77 | 49.6 | L6(meniscus) |
| S12 | 27.75 | 0.10 | | | |
| S13* | 4.20 | 2.00 | 1.54 | 56.1 | L7(aspheric) |
| S14* | -29.22 | 1.55 | | | |
| S15 | ∞ | 0.45 | 1.51 | 64.1 | cover glass |
| S16 | ∞ | 0.47 | | | |
| | | | | | image plane |

Effective focal length (EFL) for visible light = 1.42 mm
F-Number = 2.0
Maximum half field of view (HFOV) = 104 degrees
Maximum image circle (IMA) at the visible light image plane = 5.26 mm
Total track length TTL (distance between the surface S1 and the visible light image plane) = 20.0 mm may have at most eight lenses with refractive power. Further, the front lens group of the optical lens may have at least one lens with positive refractive power that may satisfy the following condition:

$$Vd<20 \qquad (2),$$

where Vd denotes an Abbe number of a lens in the front lens group nearest the aperture stop. Specifically, in case the lens in the front lens group nearest the aperture stop is designed to meet the condition of Vd<20, it may indicate that the lens has a high refractive index to reduce aberrations and thus achieve good imaging quality.

An optical lens according to another embodiment of the invention may include two lens groups and may have an F number of 2.0, and each of the lens groups may have at least one aspheric lens to correct monochromatic and chromatic aberrations. Further, the front lens group of the optical lens may have at least one lens with positive refractive power, and the optical lens may satisfy the following conditions:

$$nd>1.66 \text{ and } Vd<45 \qquad (3)$$

$$R<5.7 \text{ and } R*TTL<140 \qquad (4),$$

where nd and Vd respectively denote a refractive index and an Abbe number of a lens in the front lens group nearest the aperture stop, R denotes a radius of curvature of an image-side surface of a lens in the front lens group nearest the object side, and TTL denotes a total track length (a distance between the surface S1 and the visible light image plane 18) of the optical lens. Specifically, in case the lens in the front lens group nearest the aperture stop is designed to meet the condition of nd>1.66 and Vd<45, it may indicate that the lens has a high refractive index to reduce aberrations and thus achieve good imaging quality. Further, in case the optical lens is designed to meet the condition of R<5.7 and R*TTL<140, the occupied space of the optical lens is reduced and thus favorable for miniaturization and lighter weights. Therefore, the optical lens that satisfies the conditions (3) and (4) may achieve good imaging quality, a high degree of miniaturization and lighter weights.

The following embodiments use similar reference numerals and contain part content of the above embodiment, where similar reference numerals refer to identical or functionally similar elements throughout the embodiments and the same technical descriptions are omitted. The content omitted may refer to the embodiment previously described and thus not described repeatedly in detail in the following embodiments.

Figure 5:
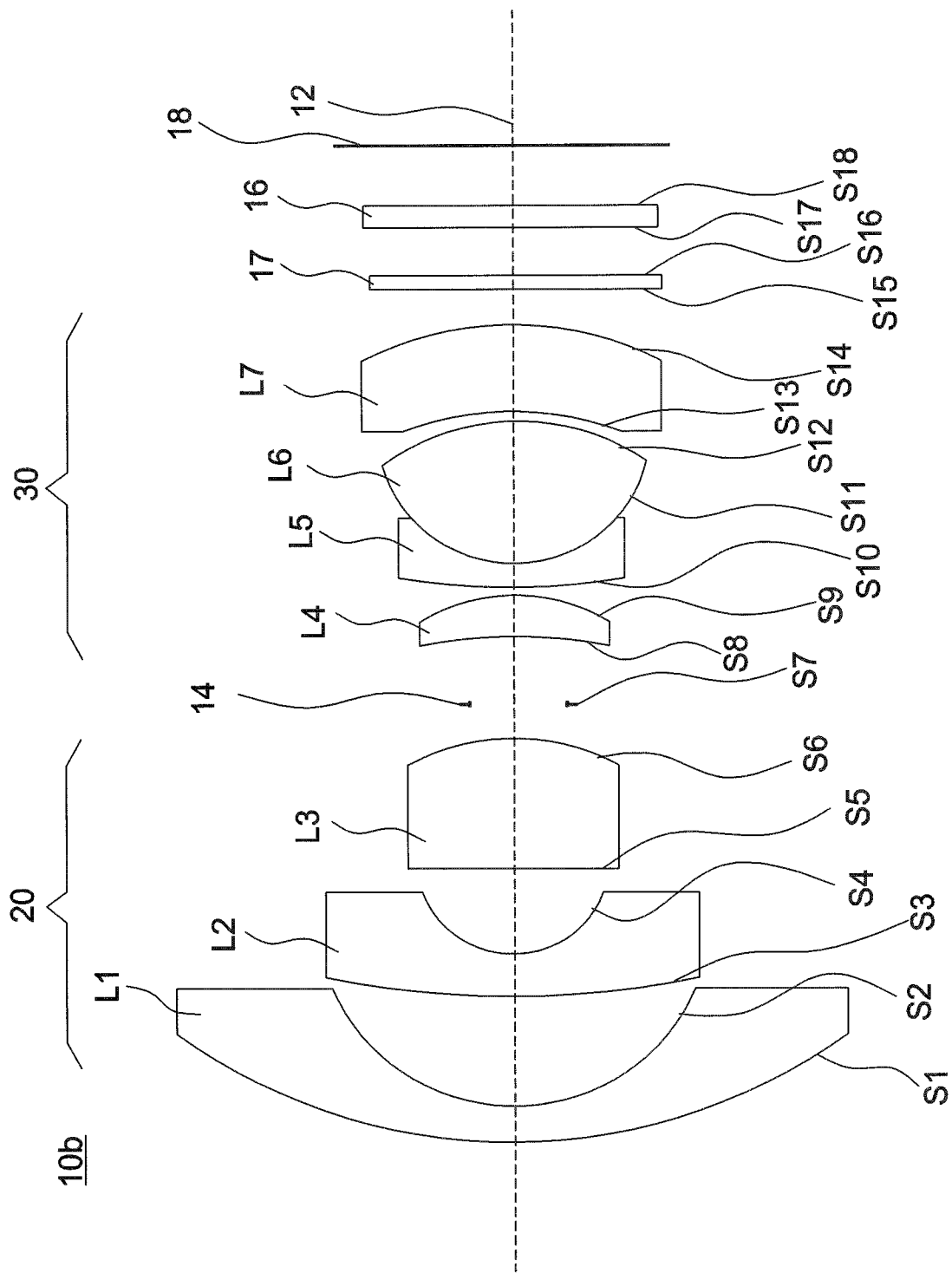
FIG. 5 shows a schematic diagram illustrating an optical lens according to another embodiment of the invention.

FIG. 5 shows a schematic diagram illustrating an optical lens according to another embodiment of the invention. The optical lens 10b is disposed between a magnified side (such as an object side on the left of FIG. 5) and a minified side (such as an image side on the right of FIG. 5). As shown in FIG. 5, the optical lens 10b may include a first lens group 20 (such as a front lens group) with negative refractive power disposed between the magnified side and the minified side, a second lens group 30 (such as a rear lens group) with positive refractive power disposed between the first lens group 20 and the minified side, and an aperture stop 14 disposed between the first lens group 20 and the second lens group 30. Further, the minified side may be disposed with an IR filter 17, a cover glass 16 and an image sensor having an image plane 18 formed at an effective focal length (EFL) for visible light of the optical lens 10b. The IR filter 17 and the cover glass 16 are disposed between the second lens group 30 and the image plane 18 for visible light. The first lens group 20 may include a first lens L1, a second lens L2 and a third lens L3 arranged in order, along the optical axis 12, from the magnified side to the minified side. The second lens group 30 may include a fourth lens L4, a fifth lens L5, a sixth lens L6 and a seventh lens L7, arranged in order, along the optical axis 12, from the magnified side to the minified side. The refractive powers of the first lens L1 to the seventh lens L7 are negative, negative, positive, positive, negative, positive and positive. In this embodiment, the second lens L2, the fourth lens L4 and seventh lens L7 are aspheric lenses. A refractive index variation as a function of temperature (dn/dt) of an aspheric lens may be smaller than $-80\times10^{-6}$ $K^{-1}$, but the invention is not limited thereto. In one embodiment, the aspheric lens may be made by glass molding. The first lens L1 and the fifth lens L5 are meniscus lenses, the third lens L3 is a plano-convex lens, and the sixth lens L6 is a biconvex lens. Further, the fifth lens L5 and the sixth lens L6 are cemented together as one piece to form a cemented doublet having positive refractive power. Note that adjoining surfaces of the fifth lens L5 and the sixth lens L6 in a cemented lens have an identical radius of curvature, and that the lenses in a cemented lens can be cemented together by various ways. For example, the lenses may be cemented together by applying an optical adhesive on lens surfaces or stacked and then pressed to be fitted with each other, but the invention is not limited thereto. In another embodiment, the adjacent surfaces of the fifth lens L5 and the sixth lens L6 may have an identical radius of curvature but maintain a small gap along the optical axis 12. The detailed optical data of the optical lens 10b such as lens parameters, shape and aspheric coefficients are shown in Tables 3-4 below, where parameters A-F shown in Table 4 are 4th, 6th, 8th, 10th, 12th and 14th order aspheric coefficients. In this embodiment, because the optical lens is a fixed focus lens, a distance between any two lenses in the optical lens remains fixed on picking-up images at various object distances.

TABLE 3

| Surface | Radius(mm) | Thickness(mm) | Refractive index | Abbe number | Object description |
|---|---|---|---|---|---|
| S1 | 12.70 | 0.70 | 1.88 | 40.8 | L1(meniscus) |
| S2 | 4.30 | 2.51 | | | |
| S3* | −25.70 | 0.88 | 1.52 | 55.4 | L2(aspheric) |
| S4* | 2.19 | 1.61 | | | |
| S5 | ∞ | 2.92 | 1.92 | 18.9 | L3(plano-convex) |
| S6 | −6.19 | 0.79 | | | |
| S7 | ∞ | 1.29 | | | aperture stop |
| S8* | −17.58 | 1.06 | 1.52 | 55.4 | L4(aspheric) |
| S9* | −3.12 | 0.10 | | | |
| S10 | 20.10 | 0.65 | 1.92 | 18.9 | L5(meniscus) |
| S11 | 3.00 | 2.99 | 1.77 | 49.6 | L6(biconvex) |
| S12 | −4.91 | 0.10 | | | |
| S13* | −11.23 | 1.90 | 1.52 | 55.4 | L7(aspheric) |

TABLE 3-continued

| Surface | Radius(mm) | Thickness(mm) | Refractive index | Abbe number | Object description |
|---|---|---|---|---|---|
| S14* | −7.15 | 0.10 | | | |
| S15 | ∞ | 0.21 | 1.51 | 64.1 | IR filter |
| S16 | ∞ | 1.27 | | | |
| S17 | ∞ | 0.4 | 1.51 | 64.1 | cover glass |
| S18 | ∞ | 0.13 | | | |
| | | | | | image plane |

Effective focal length (EFL) for visible light = 1.34 mm
F-Number = 2.0
Maximum half field of view (HFOV) = 108 degrees
Maximum image circle (IMA) at the visible light image plane = 5.26 mm
Total track length TTL (distance between the surface S1 and the visible light image plane) = 19.59 mm In the above Table 3, a thickness of the surface S1 is a distance between the surface S1 and the surface S2 along the optical axis 12, a thickness of the surface S2 is a distance between the surface S2 and the surface S3 along the optical axis 12, and a thickness of the surface S18 is a distance between the surface S18 of the cover glass 16 and the visible light image plane 18 along the optical axis 12.

TABLE 4

| | S3 | S4 | S8 | S9 |
|---|---|---|---|---|
| K | 0 | 0 | 0 | 0 |
| A | 8.02E−003 | 1.08E−002 | 3.74E−003 | 1.33E−002 |
| B | −7.29E−004 | −1.16E−003 | 2.05E−004 | −2.96E−004 |
| C | 3.02E−005 | 1.58E−003 | −9.32E−004 | −1.31E−004 |
| D | −6.57E−008 | −7.43E−004 | 1.34E−004 | −1.00E−004 |
| E | −5.02E−008 | 1.77E−004 | 0.00E+000 | 1.74E−005 |
| F | 1.56E−009 | −2.11E−005 | 0.00E+000 | 0.00E+000 |

| | S13 | S14 |
|---|---|---|
| K | 0 | 0 |
| A | 8.69E−003 | 1.07E−002 |
| B | −9.65E−004 | 2.98E−006 |
| C | −7.23E−005 | −4.79E−004 |
| D | −8.10E−007 | 5.90E−005 |
| E | 9.25E−007 | −2.13E−006 |
| F | 0.00E+000 | 0.00E+000 |

Figure 6:
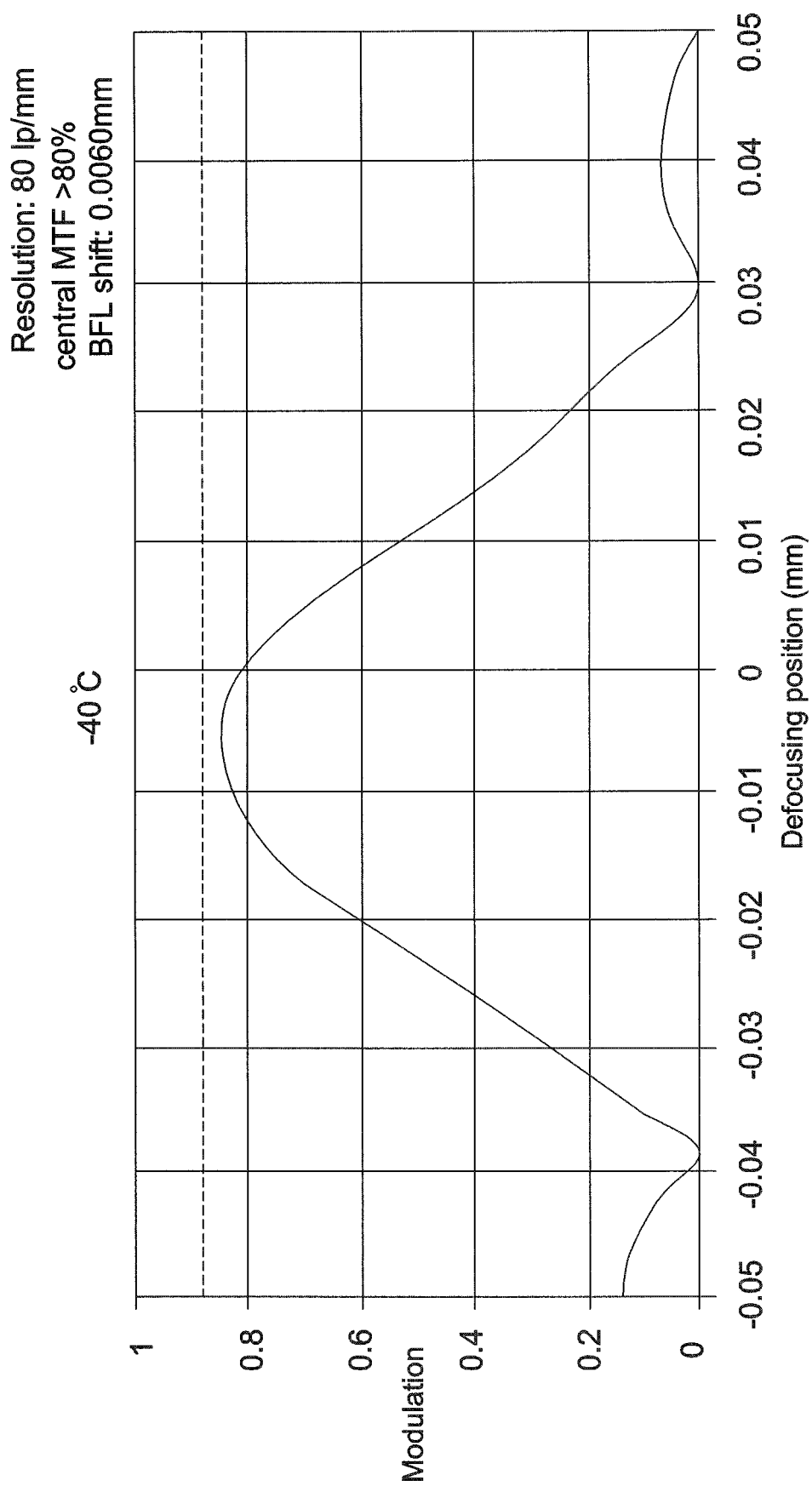
FIGS. 6-8 show optical simulation results of the optical lens shown in FIG. 5, where diffractive MTF curves for visible light respectively measured at a temperature of −40° C., 20° C. and 105° C. are depicted.
Figure 7:
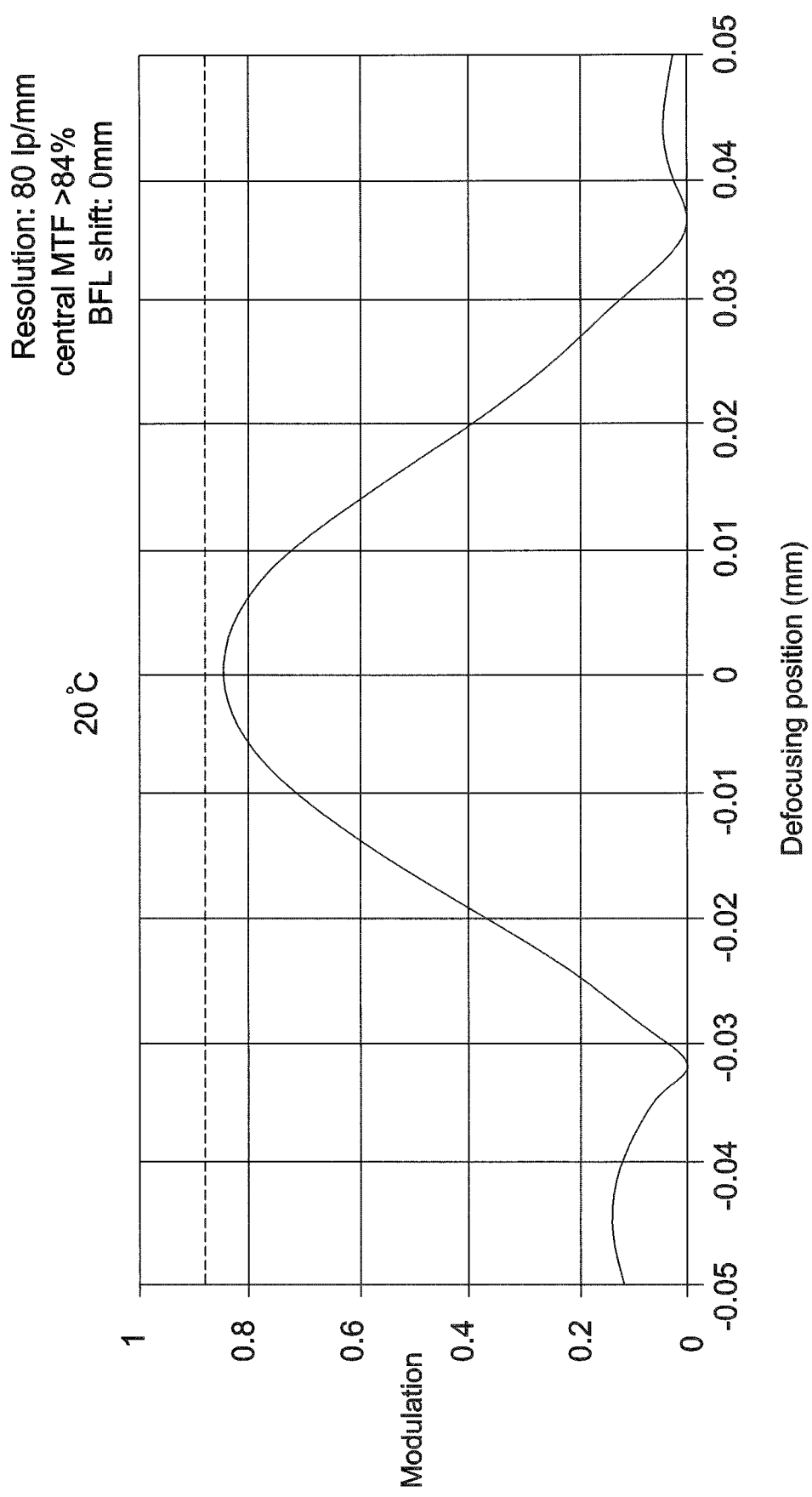
Figure 8:
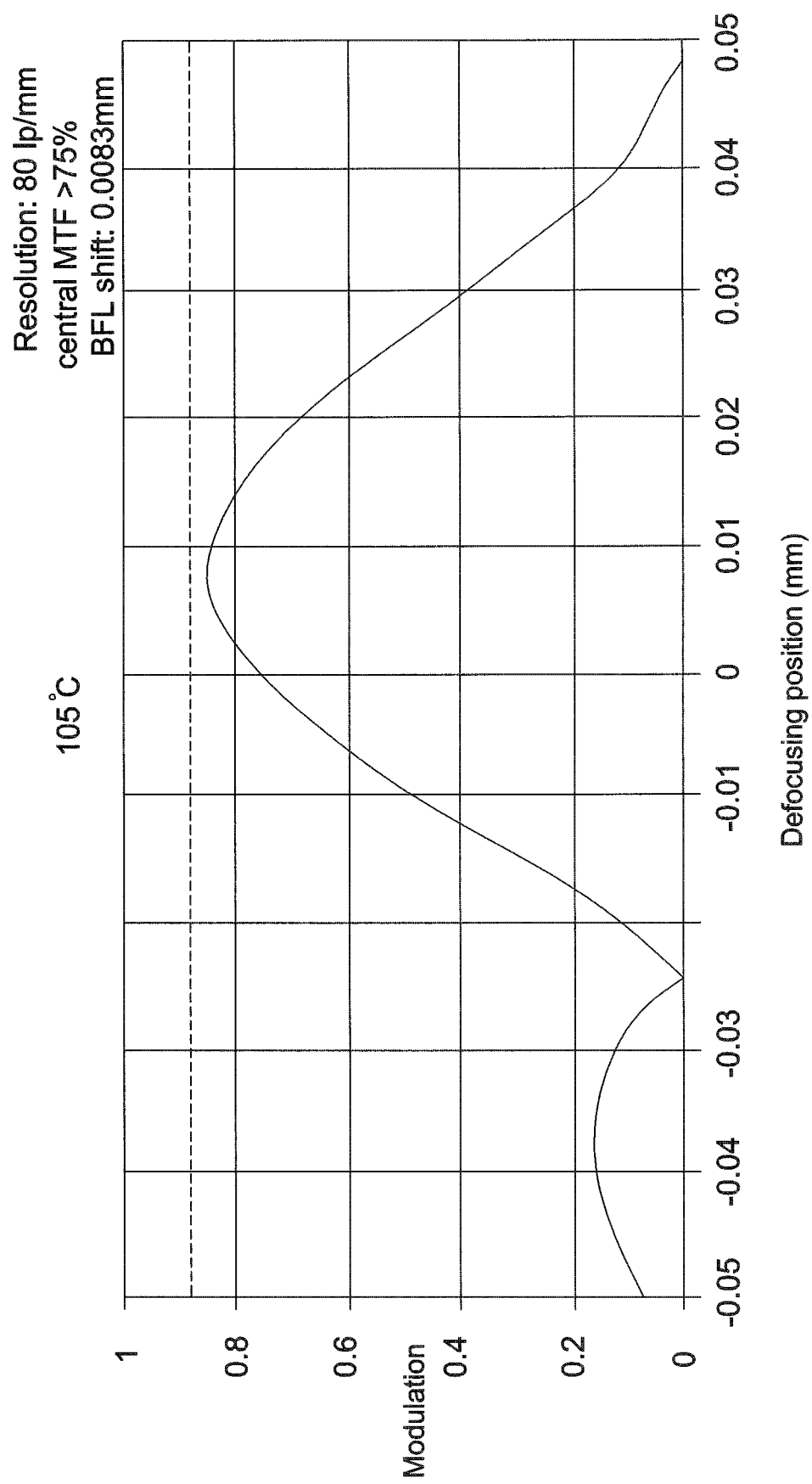

FIGS. 6-8 depict diffractive MTF curves for visible light respectively measured at a temperature of −40° C., 20° C. and 105° C. Under the condition of a lens resolution of 80 lp/mm, the MTF value measured at the center of each diffractive MTF curve shown in FIGS. 6-8 is all larger than 75%. Further, by comparing different diffractive MTF curves shown in FIGS. 6-8, it can be seen, in case a back focal length (BFL) measured at 20° C. serves as a reference BEL, a focus shift on the BFL measured at −40° C. and a focus shift on the BFL measured at 105° C. relative to the reference BEL are both smaller than 9 μm. The simulated results shown in FIGS. 6-8 are within permitted ranges specified by the standard, which indicates the optical lens 10b according to the above embodiment may achieve good imaging quality in a wide temperature range of −40° C. to 105° C.

An optical lens according to one embodiment of the invention may include two lens groups and may have an F number of 2.0, and each of the lens groups may have at least three lenses with refractive power and at least one aspheric lens to correct monochromatic and chromatic aberrations. The optical lens may have at most eight lenses with refractive power. Further, the front lens group of the optical lens may have at least one lens with positive refractive power, the lens with positive refractive power may be nearest the aperture stop than any other lens in the front lens group and may satisfy the following condition:

$$Vd<20 \qquad (2),$$

where Vd denotes an Abbe number of a lens with positive refractive power in the front lens group nearest the aperture stop. Specifically, in case the lens in the front lens group nearest the aperture stop is designed to meet the condition of Vd<20, it may indicate that the lens has a high refractive index to reduce aberrations and thus achieve good imaging quality.

Figure 9:
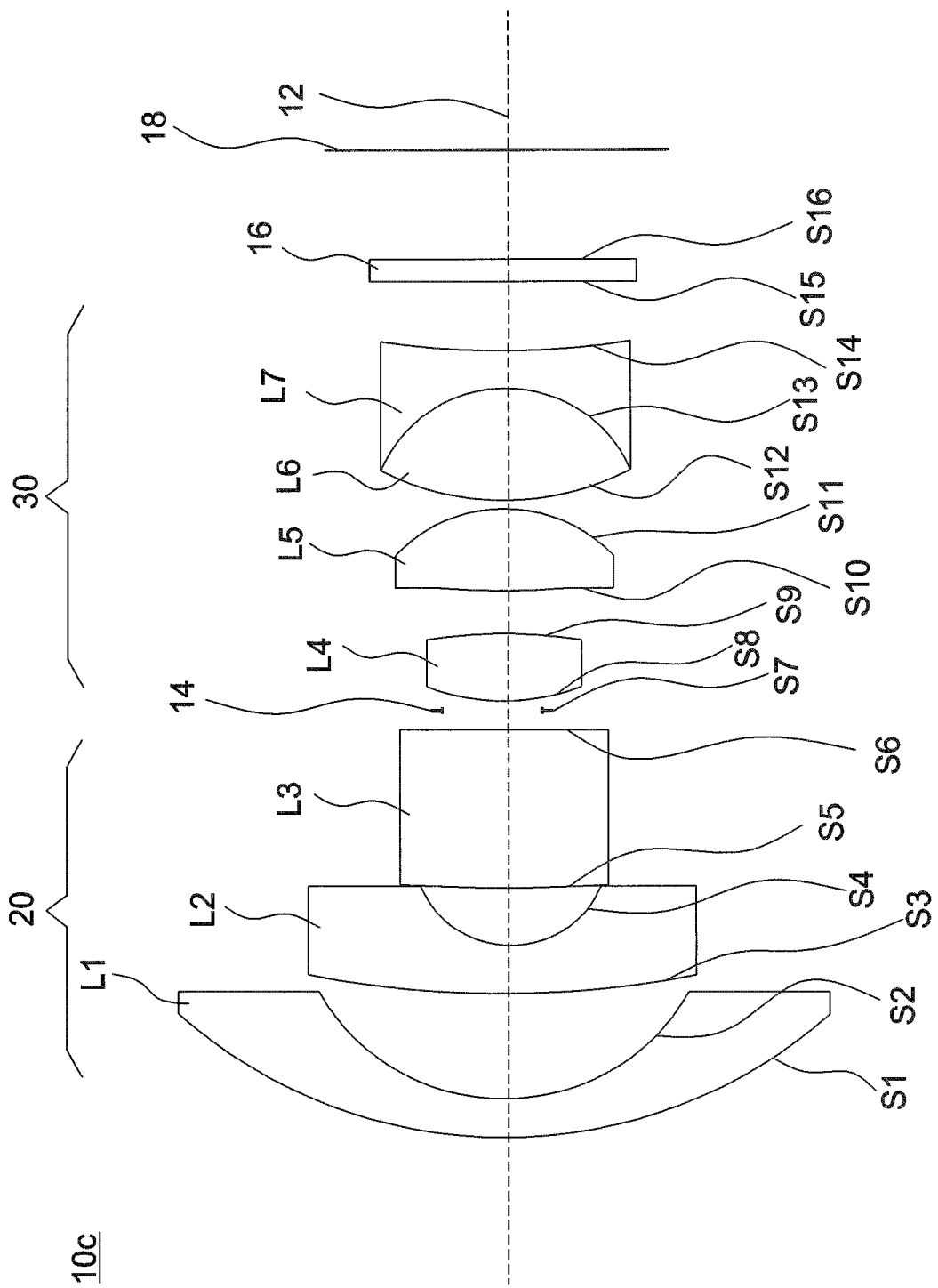
FIG. 9 shows a schematic diagram illustrating an optical lens according to another embodiment of the invention.

An optical lens according to another embodiment of the invention may include two lens groups and may have an F number of 2.0, and each of the lens groups may have at least one aspheric lens to correct monochromatic and chromatic aberrations. Further, the front lens group of the optical lens may have at least one lens with positive refractive power, the lens with positive refractive power may be nearest the aperture stop than any other lens in the front lens group, and the optical lens may satisfy the following conditions:

$$nd>1.66 \text{ and } Vd<45 \qquad (3)$$

$$R<5.7 \text{ and } R*TTL<140 \qquad (4),$$

where nd and Vd respectively denote a refractive index and an Abbe number of a lens of the front lens group nearest the aperture stop, R denotes a radius of curvature of an image-side surface of a lens in the front lens group nearest the object side, and TTL denotes a total track length of the optical lens. Specifically, in case the lens in the front lens group nearest the aperture stop is designed to meet the condition of nd>1.66 and Vd<45, it may indicate that the lens has a high refractive index to reduce aberrations and thus achieve good imaging quality. Further, in case the optical lens is designed to meet the condition of R<5.7 and R*TTL<140, the occupied space of the optical lens is reduced and thus favorable for miniaturization and lighter weights. Therefore, the optical lens 10b that satisfies the conditions (3) and (4) may achieve good imaging quality, a high degree of miniaturization and lighter weights FIG. 9 shows a schematic diagram illustrating an optical lens according to another embodiment of the invention. The optical lens 10c is disposed between a magnified side (such as an object side on the left of FIG. 9) and a minified side (such as an image side on the right of FIG. 9). As shown in FIG. 9, the optical lens 10c may include a first lens group 20 (such as a front lens group) with negative refractive power disposed between the magnified side and the minified side, a second lens group 30 (such as a rear lens group) with positive refractive power disposed between the first lens group 20 and the minified side, and an aperture stop 14 disposed between the first lens group 20 and the second lens group 30. Further, the minified side may be disposed with a cover glass 16 and an image sensor having an image plane 18 formed at an effective focal length (EFL) for visible light of the optical lens 10c. The cover glass 16 is disposed between the second lens group 30 and the image plane 18 for visible light. The first lens group 20 may include a first lens L1, a second lens L2 and a third lens L3 arranged in order, along an optical axis 12, from the magnified side to the minified side. The second lens group 30 may include a fourth lens L4, a fifth lens L5, a sixth lens L6 and a seventh lens L7, arranged in order, along the optical axis 12, from the magnified side to the minified side. The refractive powers of the first lens L1 to the seventh lens L7 are negative, negative, positive, positive, positive, positive and negative. In this embodiment, the second lens L2 and the fifth lens L5 are aspheric lenses. A refractive index variation as a function of temperature (dn/dt) of an aspheric lens may be smaller than $-80 \times 10^{-6}$ $K^{-1}$, but the invention is not limited thereto. In one embodiment, the aspheric lenses may be made by glass molding. The first lens L1 is a meniscus lens. The third lens L3, the fourth lens L4 and the sixth lens L6 are biconvex lenses, and the seventh lens L7 is a biconcave lens. Further, the sixth lens L6 and the seventh lens L7 are cemented together as one piece to form a cemented doublet having positive refractive power. Note that adjoining surfaces of the sixth lens L6 and the seventh lens L7 in a cemented lens have an identical radius of curvature, and that the lenses in a cemented lens can be cemented together by various ways. For example, the lenses may be cemented together by applying an optical adhesive on lens surfaces or stacked and then pressed to be fitted with each other, but the invention is not limited thereto. In another embodiment, the adjacent surfaces of the sixth lens L6 and the seventh lens L7 may have an identical radius of curvature but maintain a small gap along the optical axis 12. The detailed optical data of the optical lens 10c such as lens parameters, shape and aspheric coefficients are shown in Tables 5-6 below, where parameters A-F shown in Table 6 are 4th, 6th, 8th, 10th, 12th and 14th order aspheric coefficients. In this embodiment, because the optical lens is a fixed focus lens, a distance between any two lenses in the optical lens remains fixed on picking-up images at various object distances.

TABLE 5

| Surface | Radius(mm) | Thickness(mm) | Refractive index | Abbe number | Object description |
|---|---|---|---|---|---|
| S1 | 10.84 | 0.70 | 1.88 | 40.8 | L1(meniscus) |
| S2 | 4.51 | 2.66 | | | |
| S3* | −29.09 | 0.95 | 1.52 | 55.4 | L2(aspheric) |
| S4* | 2.12 | 1.23 | | | |
| S5 | 45.02 | 3.71 | 2.00 | 19.3 | L3(biconvex) |
| S6 | −178.13 | 0.50 | | | |
| S7 | ∞ | 0.10 | | | aperture stop |
| S8 | 6.35 | 1.41 | 1.52 | 55.4 | L4(biconvex) |
| S9 | −7.38 | 1.13 | | | |
| S10* | −110.65 | 1.71 | 1.52 | 55.4 | L5(aspheric) |
| S11* | −4.26 | 0.10 | | | |
| S12 | 5.27 | 2.63 | 1.79 | 46.9 | L6(biconvex) |
| S13 | −3.00 | 0.91 | 2.00 | 19.3 | L7(biconcave) |
| S14 | 31.60 | 1.51 | | | |
| S15 | ∞ | 0.40 | 1.51 | 64.1 | cover glass |
| S16 | ∞ | 0.13 | | | |
| | | | | | image plane |

Effective focal length (EFL) for visible light = 1.41 mm
F-Number = 2.0
Maximum half field of view (HFOV) = 104 degrees
Maximum image circle (IMA) at the visible light image plane = 5.26 mm
Total track length TTL (distance between the surface S1 and the visible light image plane) = 19.76 mm In the above Table 5, a thickness of the surface S1 is a distance between the surface S1 and the surface S2 along the optical axis 12, a thickness of the surface S2 is a distance between the surface S2 and the surface S3 along the optical axis 12, and a thickness of the surface S16 is a distance between the surface S16 of the cover glass 16 and the visible light image plane 18 along the optical axis 12.

TABLE 6

| | S3 | S4 | S10 | S11 |
|---|---|---|---|---|
| K | 0 | 0 | 0 | 0 |
| A | 5.57E−003 | 3.21E−003 | −1.03E−002 | −3.46E−003 |
| B | −5.70E−004 | 3.14E−003 | 5.56E−003 | 1.20E−003 |
| C | 3.09E−005 | −6.86E−004 | −3.41E−003 | −5.29E−004 |
| D | −2.46E−007 | −3.37E−004 | 9.71E−004 | 9.39E−005 |
| E | −5.13E−008 | 1.71E−004 | −1.27E−004 | −1.00E−005 |
| F | 1.66E−009 | −2.18E−005 | 0.00E+000 | 0.00E+000 |

According to the above embodiment, the optical lens may achieve good imaging quality, a higher degree of miniaturization, lighter weights and lower fabrication costs. In one embodiment, an HFOV is larger than 105 degrees, preferably larger than 110 degrees, and more preferably larger than 115 degrees. In one embodiment, a working temperature range of the optical lens is −40° C.-105° C. In one embodiment, a maximum image circle (IMA) at the visible light image plane is 4-6 mm, preferably 4.5-6 mm, and more preferably 5-6 mm. According to the above embodiment, the optical lens may achieve lower fabrication costs, a larger aperture stop, wider viewing angles, lighter weights, a wider working temperature range and a larger image circle. Further, the above embodiments may provide a panoramic lens having lower fabrication costs and good imaging quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. An optical lens, comprising:
    a first lens group with negative refractive power comprising at least three lenses with refractive powers, the at least three lenses with refractive powers including at least one aspheric lens, and the first lens group having a lens with positive refractive power and an Abbe number of smaller than 20;
    a second lens group with positive refractive power comprising at least three lenses with refractive powers, the at least three lenses with refractive powers including at least one aspheric lens, and a total number of lenses in the first lens group and the second lens group being less than 9, wherein each of the first lens group and the second lens group comprises a lens having a refractive index variation as a function of temperature (dn/dt) of smaller than $-80 \times 10^{-6}$ $K^{-1}$; and
    an aperture stop disposed between the two lens groups.

2. The optical lens as claimed in claim 1, wherein the optical lens satisfies the condition of nd> 1.66, where nd denotes a refractive index of the lens with positive refractive power in the first lens group.

3. The optical lens as claimed in claim 2, wherein a distance between any two lenses in the optical lens remains fixed on picking-up images at various object distances.

4. The optical lens as claimed in claim 1, wherein the second lens group comprises a cemented lens.

5. The optical lens as claimed in claim 1, wherein the lens having positive refractive power is nearest the aperture stop than any other lens in the first lens group.

6. The optical lens as claimed in claim 1, wherein the at least one aspheric lens in the first lens group is located further away from the aperture stop than the lens having positive refractive power in the first lens group.

7. The optical lens as claimed in claim 1, wherein the at least one aspheric lens in the second lens group is located further away from the aperture stop than any other singlet lens in the second lens group.

8. The optical lens as claimed in claim 1, wherein the second lens group comprises two aspheric lenses.

9. The optical lens as claimed in claim 1, wherein a maximum image circle diameter at a visible light image plane of the optical lens is 4-6 mm.

10. The optical lens as claimed in claim 1, wherein a distance between any two lenses in the optical lens remains fixed on picking-up images at various object distances.

11. The optical lens as claimed in claim 1, wherein the optical lens satisfies the condition:

$R<5.7$; and $R*TTL<140$ where R denotes a radius of curvature of an image-side surface of a lens in the first lens group nearest the object side, and TTL denotes a total track length.

12. The optical lens as claimed in claim 11, wherein the second lens group comprises a cemented lens.

13. The optical lens as claimed in claim 11, wherein the lens having positive refractive power is nearest the aperture stop than any other lens in the first lens group.

14. The optical lens as claimed in claim 11, wherein the at least one aspheric lens in the first lens group is located further away from the aperture stop than the lens having positive refractive power in the first lens group.

15. The optical lens as claimed in claim 11, wherein the at least one aspheric lens in the second lens group is located further away from the aperture stop than any other singlet lens in the second lens group.

16. The optical lens as claimed in claim 11, wherein the second lens group comprises two aspheric lenses.

17. The optical lens as claimed in claim 11, wherein a maximum image circle diameter at a visible light image plane of the optical lens is 4-6 mm.

18. The optical lens as claimed in claim 11, wherein a distance between any two lenses in the optical lens remains fixed on picking-up images at various object distances.

* * * * *